(12) United States Patent
Walter

(10) Patent No.: US 11,033,012 B2
(45) Date of Patent: Jun. 15, 2021

(54) FISHING LURES HAVING ELASTOMERIC PORTIONS

(71) Applicant: Ronald P. Walter, Reedsville, PA (US)

(72) Inventor: Ronald P. Walter, Reedsville, PA (US)

(73) Assignee: Ronald P. Walter, Reedsville, PA (US)

( * ) Notice: Subject to any disclaimer, the term of this patent is extended or adjusted under 35 U.S.C. 154(b) by 0 days.

(21) Appl. No.: 14/809,026

(22) Filed: Jul. 24, 2015

(65) Prior Publication Data

US 2016/0050898 A1 Feb. 25, 2016

Related U.S. Application Data

(60) Provisional application No. 62/030,248, filed on Jul. 29, 2014, provisional application No. 62/118,535, filed on Feb. 20, 2015.

(51) Int. Cl.
| | |
|---|---|
| *A01K 85/00* | (2006.01) |
| *A01K 99/00* | (2006.01) |
| *A01K 85/16* | (2006.01) |
| *A01K 85/01* | (2006.01) |
| *B29C 45/26* | (2006.01) |
| *B29L 31/00* | (2006.01) |
| *B29K 21/00* | (2006.01) |

(52) U.S. Cl.
CPC .............. *A01K 85/00* (2013.01); *A01K 85/01* (2013.01); *A01K 85/16* (2013.01); *A01K 99/00* (2013.01); *B29C 45/2628* (2013.01); *B29K 2021/006* (2013.01); *B29L 2031/7002* (2013.01)

(58) Field of Classification Search
CPC ........ A01K 85/00; A01K 85/02; A01K 83/02; A01K 99/00

USPC ............. 43/42.24, 42.1, 42.41, 42.37, 42.39, 43/34–37
See application file for complete search history.

(56) References Cited

U.S. PATENT DOCUMENTS

| | | | | | |
|---|---|---|---|---|---|
| 1,173,694 | A | * | 2/1916 | Witty ..................... | A01K 85/02 43/35 |
| 1,670,174 | A | * | 5/1928 | Wiersma ................ | A01K 85/02 43/35 |

(Continued)

FOREIGN PATENT DOCUMENTS

| | | | |
|---|---|---|---|
| AU | 2014100214 A4 | 4/2014 | |
| CA | 2306041 A1 * | 10/2001 | ............. A01K 85/02 |

(Continued)

OTHER PUBLICATIONS

Translation of JP 2009-72109.*

*Primary Examiner* — Darren W Ark
(74) *Attorney, Agent, or Firm* — Moore & Van Allen PLLC; Henry B. Ward, III

(57) ABSTRACT

An elastomeric fishing lure is provided having a flexible body portion having first and second ends, wherein the body portion defines an axis extending along the centerline of the body portion. The elastomeric fishing lure has at least one elongate slot in the body portion, the at least one elongate slot defining first and second ends and a slot length extending therebetween, the at least one elongate slot defining a pair of opposed sidewalls, wherein the distance between the opposed sidewalls defines a slot width, the at least one elongate slot extending through the body portion along at least a portion of the slot length.

13 Claims, 9 Drawing Sheets

(56) References Cited

U.S. PATENT DOCUMENTS

| | | | | |
|---|---|---|---|---|
| 2,244,980 A * | 6/1941 | Abramson | A01K 83/02 | 43/35 |
| 2,256,088 A * | 9/1941 | Hogan | A01K 83/02 | 43/35 |
| 2,281,480 A * | 4/1942 | Clark | A01K 85/02 | 43/42.13 |
| 2,306,181 A * | 12/1942 | Neumann | A01K 97/045 | 43/42.1 |
| 2,389,883 A * | 11/1945 | Worden | A01K 85/16 | 43/37 |
| 2,396,366 A * | 3/1946 | Forbess | A01K 83/02 | 43/36 |
| 2,403,202 A * | 7/1946 | Woodward | A01K 83/02 | 43/35 |
| 2,563,825 A * | 8/1951 | Ebert | A01K 85/14 | 43/42.24 |
| 2,563,880 A * | 8/1951 | Spaid | A01K 83/02 | 43/37 |
| 2,572,608 A * | 10/1951 | Gabor | A01K 97/045 | 43/42.1 |
| 2,613,469 A * | 10/1952 | Haberkorn | A01K 85/02 | 43/35 |
| 2,619,756 A * | 12/1952 | Hunicke | A01K 85/02 | 43/35 |
| 2,814,149 A * | 11/1957 | Hunicke | A01K 85/02 | 29/436 |
| 2,976,641 A * | 3/1961 | Carmosino | A01K 83/02 | 43/35 |
| 3,059,371 A * | 10/1962 | Haynie, Sr. | A01K 85/02 | 43/35 |
| 3,230,656 A * | 1/1966 | Kozjak | A01K 85/02 | 43/42.1 |
| 3,411,233 A * | 11/1968 | Hopper | A01K 85/02 | 43/35 |
| 3,497,985 A * | 3/1970 | Margulies | A01K 85/00 | 43/35 |
| 3,748,774 A * | 7/1973 | Bryant | A01K 85/02 | 43/42.1 |
| 3,861,075 A * | 1/1975 | Ingram | A01K 85/16 | 43/42.26 |
| 4,044,492 A * | 8/1977 | Ingram | A01K 85/00 | 43/42.28 |
| 4,139,963 A * | 2/1979 | Ingram | A01K 85/16 | 43/42.03 |
| 4,196,884 A * | 4/1980 | Zeman | A01K 85/00 | 249/142 |
| 4,367,607 A * | 1/1983 | Hedman | A01K 85/00 | 43/42.1 |
| 4,672,768 A * | 6/1987 | Pippert | A01K 85/16 | 43/42.09 |
| 4,777,756 A * | 10/1988 | Mattison | A01K 69/06 | 43/17.6 |
| 4,782,618 A * | 11/1988 | Rainey | A01K 85/02 | 43/35 |
| 4,783,928 A * | 11/1988 | Weaver | A01K 85/16 | 43/42.06 |
| 4,873,781 A * | 10/1989 | Bates | A01K 85/02 | 43/35 |
| 4,873,783 A * | 10/1989 | McGahee | A01K 85/00 | 43/42.24 |
| 4,907,364 A * | 3/1990 | Hedman | A01K 85/00 | 43/42.39 |
| 4,976,060 A * | 12/1990 | Nienhuis | A01K 85/02 | 43/42.41 |
| 5,010,679 A * | 4/1991 | Tischer | A01K 85/02 | 43/35 |
| 5,193,299 A * | 3/1993 | Correll | A01K 85/16 | 43/42.24 |
| 5,218,778 A * | 6/1993 | Szantor | A01K 85/02 | 43/42.41 |
| 5,367,818 A * | 11/1994 | Aduana | A01K 85/02 | 43/42.41 |
| 5,428,918 A * | 7/1995 | Garrison | A01K 85/00 | 43/42.24 |
| 5,678,350 A * | 10/1997 | Moore | A01K 85/01 | 43/42.15 |
| 6,041,540 A * | 3/2000 | Potts | A01K 85/00 | 43/42.08 |
| 6,182,391 B1 * | 2/2001 | Hubbard | A01K 85/00 | 43/42.32 |
| 6,266,916 B1 * | 7/2001 | Dugan | A01K 85/00 | 43/42.06 |
| 6,393,755 B1 * | 5/2002 | Weaver | A01K 85/01 | 43/42.03 |
| 6,618,979 B2 * | 9/2003 | Wacha | A01K 85/00 | 43/42.36 |
| 6,651,375 B2 * | 11/2003 | Parrish | A01K 85/02 | 43/35 |
| 6,718,683 B2 * | 4/2004 | Hawkins | A01K 85/00 | 43/42.37 |
| 6,941,695 B2 * | 9/2005 | Minegar | A01K 85/02 | 43/34 |
| 7,185,457 B2 * | 3/2007 | Nichols | A01K 85/00 | 43/42.24 |
| 7,266,922 B2 * | 9/2007 | Oelerich, Jr. | A01K 85/00 | 43/42.24 |
| 7,559,172 B2 * | 7/2009 | Hogan | A01K 91/04 | 43/4.5 |
| 7,793,457 B2 * | 9/2010 | Hogan | A01K 85/00 | 43/42.1 |
| 7,827,731 B2 * | 11/2010 | Gibson | A01K 85/00 | 43/42.39 |
| 7,954,274 B2 * | 6/2011 | MacDonald | A01K 85/00 | 43/42.02 |
| 8,020,338 B2 * | 9/2011 | Brown | A01K 85/00 | 43/42.02 |
| 8,181,382 B2 * | 5/2012 | Pack | A01K 85/18 | 43/42.15 |
| 8,635,804 B1 * | 1/2014 | Lefebre | A01K 85/00 | 43/42.35 |
| 8,857,100 B2 * | 10/2014 | Huddleston | A01K 85/00 | 43/42.1 |
| 9,060,499 B2 * | 6/2015 | Roberts | A01K 85/00 | |
| 9,101,122 B2 * | 8/2015 | Odem | A01K 85/02 | |
| 9,420,773 B2 * | 8/2016 | Stokes | A01K 85/02 | |
| 9,456,591 B2 * | 10/2016 | Nichols | A01K 85/16 | |
| 10,021,862 B2 * | 7/2018 | Guennal | A01K 85/00 | |
| 10,368,534 B2 * | 8/2019 | Guennal | A01K 85/00 | |
| 2003/0024150 A1 * | 2/2003 | Hawkins | A01K 85/00 | 43/42.39 |
| 2003/0159328 A1 * | 8/2003 | Acker | A01K 85/00 | 43/42.37 |
| 2003/0182843 A1 * | 10/2003 | Smart | A01K 83/06 | 43/44.2 |
| 2003/0192227 A1 * | 10/2003 | Stava, III | A01K 85/00 | 43/42.24 |
| 2005/0217166 A1 * | 10/2005 | MacDonald | A01K 85/00 | 43/42.36 |
| 2007/0175083 A1 * | 8/2007 | Wilson | A01K 85/02 | 43/42.15 |
| 2007/0199232 A1 * | 8/2007 | Littlejohn | A01K 85/02 | 43/42.1 |
| 2012/0005944 A1 * | 1/2012 | Carswell | A01K 85/00 | 43/42.3 |
| 2012/0311917 A1 * | 12/2012 | Guennal | A01K 85/00 | 43/42.1 |
| 2014/0013648 A1 * | 1/2014 | Yong-Set | A01K 85/02 | 43/42.41 |
| 2016/0120160 A1 * | 5/2016 | Penn | A01K 85/02 | 43/42.1 |
| 2016/0143258 A1 * | 5/2016 | Brandt | A01K 85/02 | 43/35 |
| 2017/0042135 A1 * | 2/2017 | Guennal | A01K 85/00 | |
| 2017/0251650 A1 * | 9/2017 | Gierlich | A01K 85/02 | |

(56) References Cited

U.S. PATENT DOCUMENTS

2017/0318792 A9 * 11/2017 Valtanen ................. A01K 85/02
2020/0344985 A1 * 11/2020 Sebile .................... A01K 85/00

FOREIGN PATENT DOCUMENTS

| EP | 1523886 A1 | * | 4/2005 | ............. A01K 85/02 |
|----|------------|---|---------|--------------------------|
| JP | 10248439 A | * | 9/1998 | |
| JP | 10248442 A | * | 9/1998 | |
| JP | 2002084927 A | * | 3/2002 | |
| JP | 2009072109 A | * | 4/2009 | |
| JP | 2009089707 A | * | 4/2009 | |
| JP | 2011172500 A | * | 9/2011 | |
| JP | 2012044972 A | * | 3/2012 | |
| JP | 2013208061 A | * | 10/2013 | |
| JP | 2017000081 A | * | 1/2017 | |
| JP | 2017079625 A | * | 5/2017 | |

\* cited by examiner

FISHING LURES HAVING ELASTOMERIC PORTIONS

CROSS REFERENCES AND RELATED APPLICATIONS

This application claims the benefit of U.S. Provisional Application No. 62/030,248, filed on Jul. 29, 2014, entitled SOFT PLASTIC FISHING LURE; and U.S. Provisional Application No. 61/118,535, filed on Feb. 20, 2015, entitled FISHING LURES HAVING ELASTOMERIC PORTIONS, the entire contents of which are hereby incorporated by reference and from which priority is claimed under 35 U.S.C. § 119.

BACKGROUND

Soft plastic fishing lures are currently made in a variety of shapes and sizes to mimic various live baitfishes. These fishing lures use deflection lips in front of the lure or a tail formation such as swimbait tails, twister tails, or ribbon tails to generate a wobble motion which is supposed to resemble the actions of live baitfish. Live baitfish have a very different swimming motion than that represented by currently available soft plastic lures. Live baitfish swim by generating a harmonic oscillation in their body which extends from their head through the body and into the tail.

Other soft plastic fishing lures have tried to improve on the oscillation motion desired to mimic live baitfish by adding groves or protrusions down the side of the body. These groves or protrusions produce an oscillation which has a jointed motion due to the relatively thick and thin body segments created by the groves and protrusions.

Thus, there remains a need for a soft plastic fishing lure that generates a harmonic oscillation that extends from the head through the body and into the tail.

BRIEF SUMMARY OF INVENTION

The following is a brief summary of the invention and is not intended to limit the scope of the invention.

To overcome the shortcomings of the existing elastomeric fishing lures, including soft plastic lures, the present invention is developed to produce an effective harmonic oscillation which extends from the head through the body and into the tail, thus mimicking live baitfish more accurately than prior art.

In accordance with the present invention, a soft plastic fishing lure having a head portion, a body portion and a tail portion. The body portion having one or more slot(s) that extends from the ventral side of the body completely through the dorsal side of the body, thus creating two or more side members coupled to the head portion at the front of the side members and coupled to the tail portion at the rear of the side members. When in use these slots become filled with water which provides a lubricant for the flexing of the side members while the surface tension of the water between the side members provides the force needed to hold the side members parallel to each other, allowing the side members to move simultaneously, thus creating a harmonic oscillation from the head through the body and the tail while still maintaining the appearance of a full bodied baitfish.

In one embodiment, the elastomeric fishing lure comprises a flexible body portion having first and second ends, wherein the body portion defines an axis extending along the centerline of the body portion. The elastomeric fishing lure also comprises at least one elongate slot in the body portion, the at least one elongate slot defining first and second ends and a slot length extending therebetween, the at least one elongate slot defining a pair of opposed sidewalls, wherein the distance between the opposed sidewalls defines a slot width, the at least one elongate slot extending through the body portion along at least a portion of the slot length. In one embodiment, the slot width is constant along the slot length. In another embodiment, the slot width varies along the slot length. In another embodiment, the surface of the at least one opposed sidewall of the at least one elongate slot is substantially smooth. In another embodiment, at least a portion of the surface of at least one opposed sidewall of the at least one elongate slot defines at least one raised portion. In another embodiment, the surface of at least one opposed sidewall of the at least one elongate slot comprises at least one indentation. In yet another embodiment, at least one fish attracting element selected from the group consisting of sound-emitting device, a light-emitting device, or a scent-emitting device, and wherein the at least one fish attracting element is secured within the at least one indentation. In another embodiment, the body portion comprises a first elastomeric region and a second elastomeric region, wherein the first elastomeric region and the second elastomeric region each have a hardness on the Shore A scale, wherein the hardness of the first elastomeric region is from approximately 2 to approximately 15 and the hardness of the second elastomeric region is from approximately 1 to approximately 8 and wherein the hardness of the first elastomeric region exceeds the hardness of the second elastomeric region. In one embodiment, the at least one elongate slot extends at least partially through the first elastomeric region. In another embodiment, the at least one elongate slot is contained entirely within the first elastomeric region.

In another embodiment, the body portion is substantially symmetrical and the axis defines an axis of symmetry, and wherein at least one elongate slot comprises a directional vector defined by a line drawn along the slot length of the at least one elongate slot through a midway point of the slot width at each of the first and second ends of the at least one elongate slot, and wherein the at least one elongate slot extends through the axis of symmetry and the axis of symmetry and the directional vector of the at least one elongate slot are either parallel or form an angle between 0° and 90°.

In another embodiment, the body portion defines a first side and a second side each extending along the axis, wherein the at least one elongate slot comprises a first elongate slot extending through the first side of the body portion, wherein the first elongate slot comprises a first directional vector defined by a line drawn along the slot length of the first elongate slot through a midway point of the slot width at each of the first and second ends of the first elongate slot, wherein the first directional vector is substantially parallel to the axis and is spaced from the axis by a first distance. In one embodiment, the at least one elongate slot comprises a second elongate slot extending through the second side of the body portion, wherein the second elongate slot comprises a second directional vector defined by a line drawn along the slot length of the second elongate slot through a midway point of the slot width at each of the first and second ends of the second elongate slot, wherein the second directional vector is substantially parallel to the axis and is spaced from the axis by a second distance. In another embodiment, the first distance and the second distance are substantially equal. In another embodiment, the first distance and the second distance are not equal. In another embodiment, the surface of at least one opposed sidewall of the at least one elongate slot defines at plurality of raised portions, wherein the at least one elongate slot comprises a directional vector defined by a line drawn along the slot length of the at least one elongate slot through a midway point of the slot width at each of the first and second ends of the at least one elongate slot, and wherein the plurality of raised portions extend parallel to the directional vector, extend perpendicular relative to the directional vector, or extend at an angle between 0° and 90° relative to the directional vector.

In another embodiment, the present invention provides a method of forming a fishing lure, comprising providing a die cavity having an elongate tool extending into the die cavity. An elastomeric resin is injected into the die cavity about the elongate tool to form a fishing lure having a flexible body portion having first and second ends, wherein the body portion defines an axis extending along the centerline of the body portion, and wherein the elongate tool forms an elongate slot in the body portion, the at least one elongate slot defining first and second ends and a slot length extending therebetween, the elongate slot defining a pair of opposed sidewalls, wherein the distance between the opposed sidewalls defines a slot width, the at least one elongate slot extending through the body portion along at least a portion of the slot length. In one embodiment, the elongate tool defines at least one indentation in the surface of the elongate tool. In another embodiment, the elongate tool defines at least one raised portion.

In another embodiment, the present invention comprises a method of forming a fishing lure, comprising providing a die cavity. An elastomeric resin is injected into the die cavity to form a fishing lure having a flexible body portion having first and second ends, wherein the body portion defines an axis extending along the centerline of the body portion. An elongate tool is inserted into the flexible body portion to form an elongate slot defining first and second ends and a slot length extending therebetween, the elongate slot defining a pair of opposed sidewalls, wherein the distance between the opposed sidewalls defines a slot width, the at least one elongate slot extending through the body portion along at least a portion of the slot length.

In yet another embodiment, the method of forming a fishing lure comprises joining a first elastomeric region to a second elastomeric region so as to define an interface, wherein the first and second elastomeric regions each have a hardness on the Shore A scale and the hardness of the first elastomeric region is from approximately 2 to approximately 15 and the hardness of the second elastomeric region is from approximately 1 to approximately 8 and wherein the hardness of the first elastomeric region exceeds the hardness of the second elastomeric region. The joining step comprises providing a die cavity having a first cavity region and a second cavity region divided by a partition. An elongate tool is provided extending into the first cavity region. A first elastomeric resin is injected into the first cavity region about the elongate tool to form the first elastomeric region. A second elastomeric resin is injected into the second cavity region to form the second elastomeric region. The partition is removed in the die cavity separating the first cavity region from the second cavity region and contacting at least a portion of the second elastomeric resin to at least a portion of the first elastomeric resin at the interface. The first and second elastomeric resins are cooled so that the first and second elastomeric resins bond together at the interface to thereby form an integral elastomeric portion comprising a flexible body portion having first and second ends, wherein the body portion defines axis extending along the centerline of the body portion, and wherein the elongate tool forms an elongate slot in the body portion, the at least one elongate slot defining first and second ends and a slot length extending therebetween, the elongate slot defining a pair of opposed sidewalls, wherein the distance between the opposed sidewalls defines a slot width, the at least one elongate slot extending through the body portion along at least a portion of the slot length.

DETAILED DESCRIPTION OF THE PREFERRED EMBODIMENT

Figure 1:
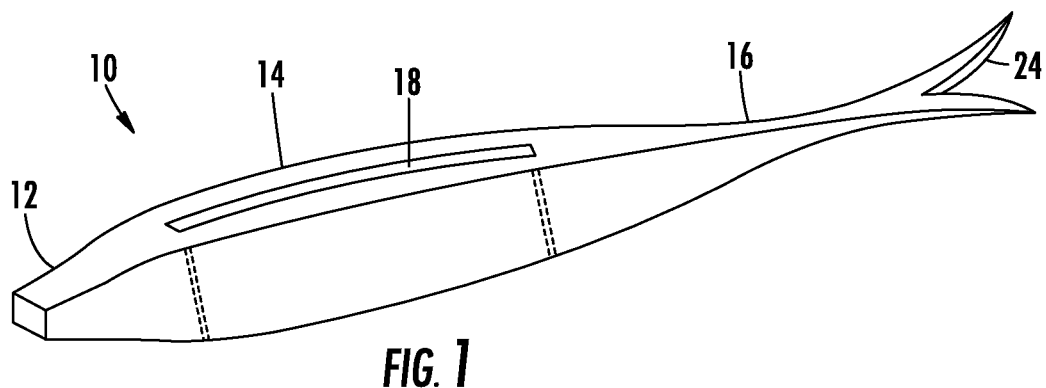
FIG. 1 is a top perspective view illustrating an elastomeric fishing lure, according to one embodiment of the present invention.
Figure 2:
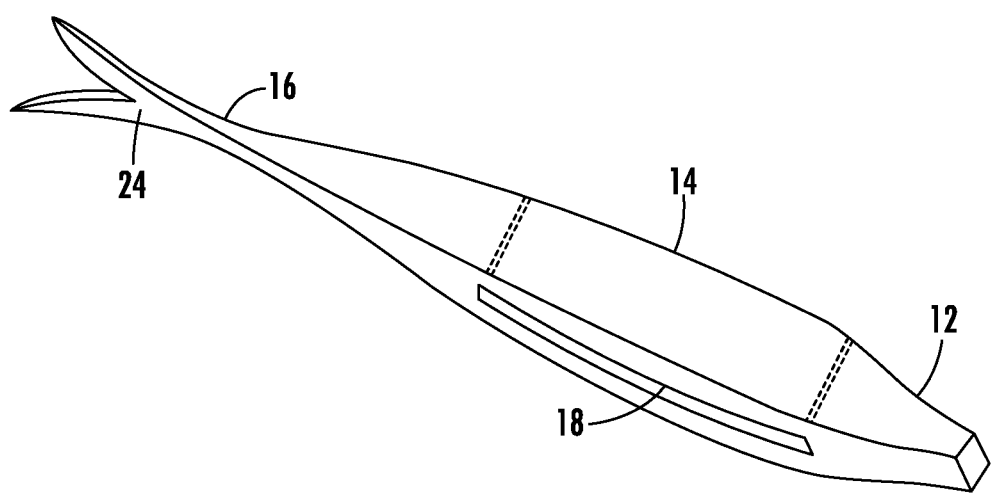
FIG. 2 is a bottom perspective view illustrating an elastomeric fishing lure, according to one embodiment of the present invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Turning now to the drawings, attention is first directed to FIGS. 1-6 in which is seen an elastomeric fishing lure, generally designated by the reference number 10. The elastomeric fishing lure 10 includes a head portion 12, a body portion 14 having first and second ends, and a tail portion 16; one or more slots (also referred to as elongate slots) 18, which in one embodiment extends completely through the body portion 14, from the ventral side to exit on the dorsal side, thus creating two or more flexible side members 22. The flexible side members 22 are separated by the slot(s) 18 which creates one or more narrow elongate aperture(s) through the body portion 14 which fills with water when placed in the water by the user. This water filled slot 18 reduces the force required to deflect the two or more flexible side member(s) 22 substantially from the force required to bend the body portion 14 if the body portion 14 were solid or nearly solid having only a ventral hook slot extending only partially into the body portion 14, to little more than the force required to deflect one side member 22. This reduction in force required to deflect the flexible side member(s) 22 allows the low pressure vortex created along the outside of side member 22, when the fishing lure 10 is manipulated through the water by the user, to deflect the side member 22 and ripple back along the side member 22 to the end of the tail portion 16.

This water filled slot 18 also provides a connection means to the other flexible side members 22 through a property of water known as surface tension. This surface tension transmits the force exerted on one side member to the other side member(s) thus moving the side members simultaneously creating a harmonic oscillation through the length of the elastomeric fishing lure 10. This oscillation creates a true swimming motion when the lure 10 is pulled through the water by the user. The user can pull the lure with the rod tip to produce the action in short bursts allowing the lure to stop and fall, then pulling it again to simulate a baitfish trying to escape or the user can reel it in at a constant speed or any combination of actions.

The front of the head portion 12 is used to place a hook through the lure 10 to attach the elastomeric fishing lure to a line to be controlled by the user. The rear side of the head 12 is connect to or formed integrally with the first end of the body portion 14. The front of the tail portion 16 is connected to or formed integrally with the second end of the body portion 14 and can be produced in a wide variety of shapes and sizes. As further seen in FIG. 2 the elastomeric fishing lure 10 is positioned with a bottom perspective view to show the slot 18 extending completely through body portion 14 to exit on the ventral side.

Figure 3:
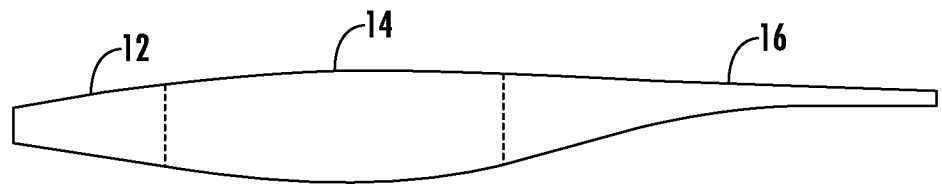
FIG. 3 is a side view illustrating an elastomeric fishing lure, according to one embodiment of the present invention.

FIG. 3 is a side view further showing the general fish like profile of the lure 10. Preferably the above described fishing lure 10 is produced with injection molding using soft plastic commonly used in the art, but it could be manufactured using any soft pliable or elastomeric material.

Figure 4:
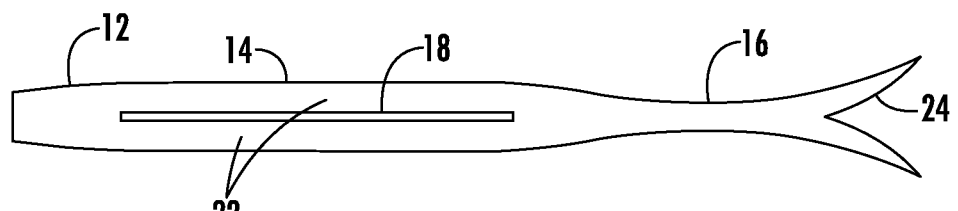
FIG. 4 is a top view illustrating an elastomeric fishing lure, according to one embodiment of the present invention.
Figure 5:
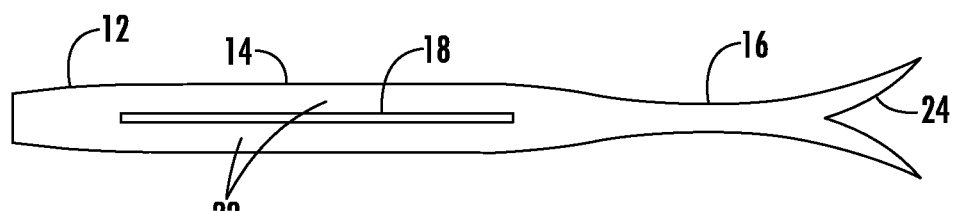
FIG. 5 is a bottom view illustrating an elastomeric fishing lure, according to one embodiment of the present invention.

As further viewed in FIG. 4 and FIG. 5 top and bottom views showing how the slot 18 divides the body portion to create side members 22. The slot 18 then becomes filled with water when submerged.

Figure 6:
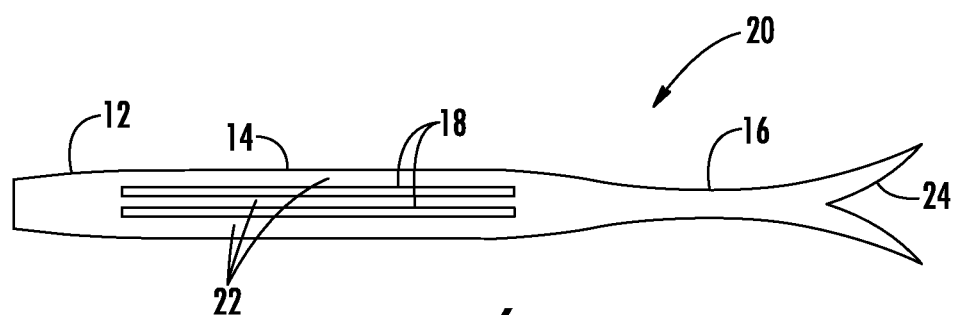
FIG. 6 is a top view illustrating an elastomeric fishing lure, according to a second embodiment of the present invention comprising multiple slots in the lure.

Attention now is directed to FIG. 6, in which an alternate embodiment of the invention, generally designated by the reference character 20. In common with the previously described embodiment of lure 10, the alternate embodiment 20 shares head portion 12, body portion 14, tail portion 16, and side members 22. However, embodiment 20 is shown to describe a possible alternate embodiment of the current invention having two elongate slots 18.

Figure 7:
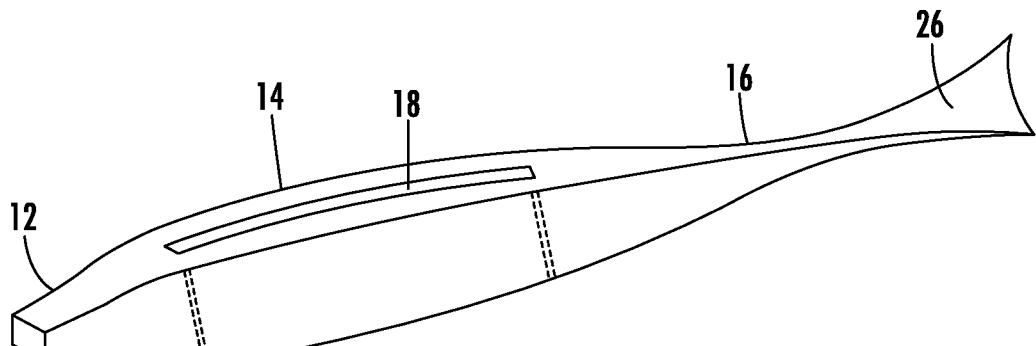
FIG. 7 is a top perspective view illustrating an elastomeric fishing lure, according to a third embodiment of the present invention comprising an alternate embodiment of the tail portion.
Figure 8:
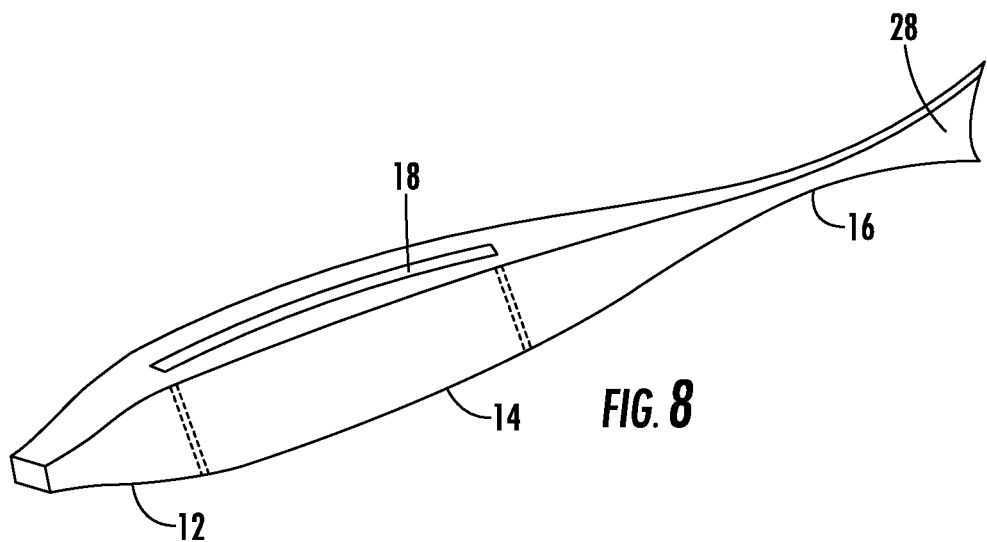
FIG. 8 is a top perspective view illustrating an elastomeric fishing lure, according to a fourth embodiment of the present invention comprising an alternate embodiment of the tail portion.
Figure 9:
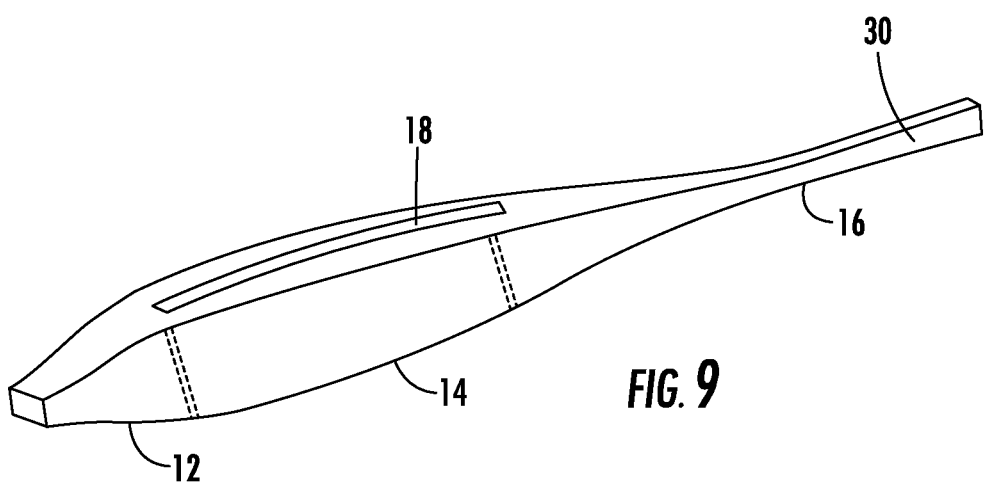
FIG. 9 is a top perspective view illustrating an elastomeric fishing lure, according to a fifth embodiment of the present invention comprising an alternate embodiment of the tail portion.

As depicted in FIG. 7, FIG. 8, and FIG. 9, there are shown alternate embodiments of the tail portion 16. Although the current preferred embodiment is that of a horizontal V-shaped tail 24, as shown in FIGS. 1-6; the tail portion 16 could also be produced as a horizontal fan 26, as illustrated in FIG. 7, or it could be produced as a vertical fan 28, as illustrated in FIG. 8, or it could be produced as a thin flat tail 30, as illustrated in FIG. 9, or any combination vertical, horizontal, fan, V-shaped configuration as well as other shapes too numerous to mention.

Figure 10:
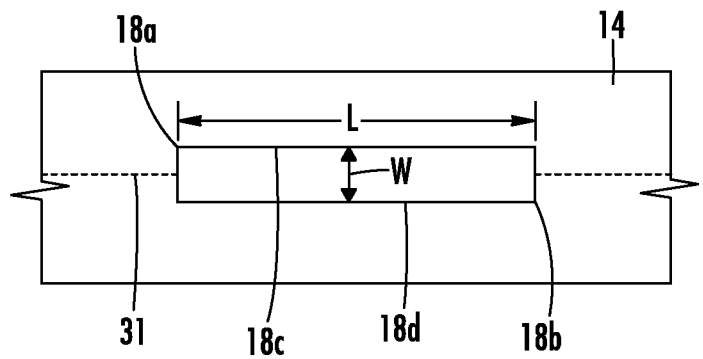
FIG. 10 is a cut-away view illustrating an elongate slot in a body portion, according to one embodiment of the present invention.

According to embodiments of the invention, as illustrated in FIG. 10, the elastomeric fishing lure 10, comprises a flexible body portion 14 having first and second ends, wherein the body portion defines an axis 31 extending along the centerline of the body portion. In some embodiments of the invention, such as that illustrated in FIG. 1, the body portion 14 is substantially symmetrical and the axis 31 defines an axis of symmetry.

Variations in the elongate slot 18 are contemplated by the present invention. Generally, as illustrated in FIG. 10, each elongate slot 18 defines a first end 18a and a second end 18b and a slot length L extending therebetween. Each elongate slot defines a pair of opposed sidewalls 18c, 18d, wherein the distance between the opposed sidewalls defines a slot width W.

Figure 11:
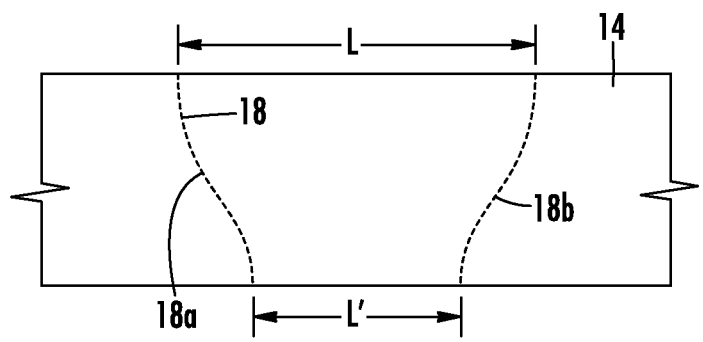
FIG. 11 is a cut-away view illustrating an elongate slot in a body portion, according to one embodiment of the present invention.
Figure 12:
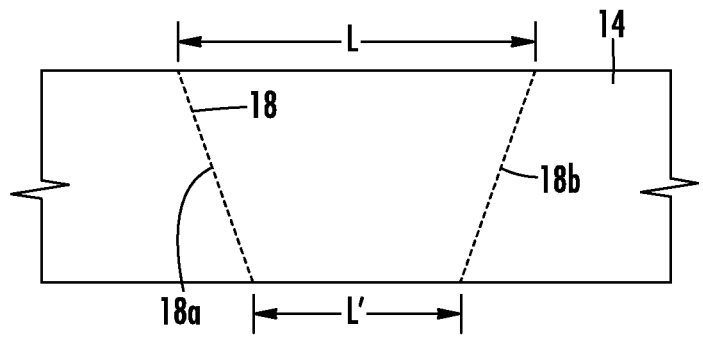
FIG. 12 is a cut-away view illustrating an elongate slot in a body portion, according to one embodiment of the present invention.
Figure 13:
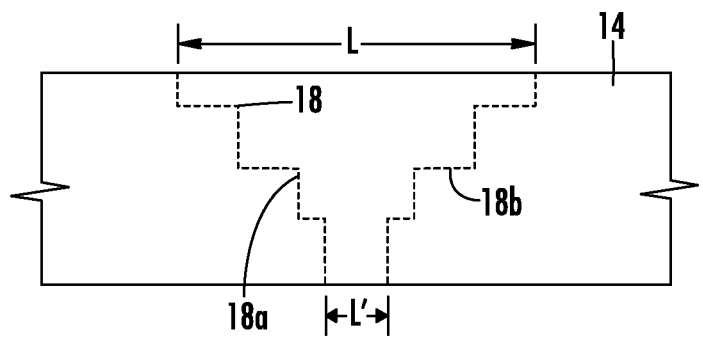
FIG. 13 is a cut-away view illustrating an elongate slot in a body portion, according to one embodiment of the present invention.

According to one embodiment of the present invention, as illustrated in FIG. 11, the elongate slot extends through the body portion 14 only along a portion of the slot length L. In other words, on one surface of the body portion 14 the elongate slot 18 has a slot length of L and on the opposite surface of the body portion 14 the elongate slot 18 has a slot length of $L^1$, where $L^1$ is less then L. Either dorsal side or the ventral side of the body portion 14 can be formed with the slot length L or the slot length $L^1$. As illustrated in FIGS. 11, 12 and 13, the configuration of the interior surface of the slot 18 at the ends 18a, 18b can vary. For purposes of example, not limitation, as illustrated in FIG. 11, the interior surface of the slot 18 at the ends 18a, 18b comprises an hour-glass like configuration. As illustrated in FIG. 12, the interior surface of the slot 18 at the ends 18a, 18b comprises an angled surface. As illustrated in FIG. 13, the interior surface of the slot 18 at the ends 18a, 18b comprises a stepped surface.

According to some embodiments, the slot width W is constant along the slot length L. According to other embodiments, the slot width W varies along the slot length L.

Figure 14:
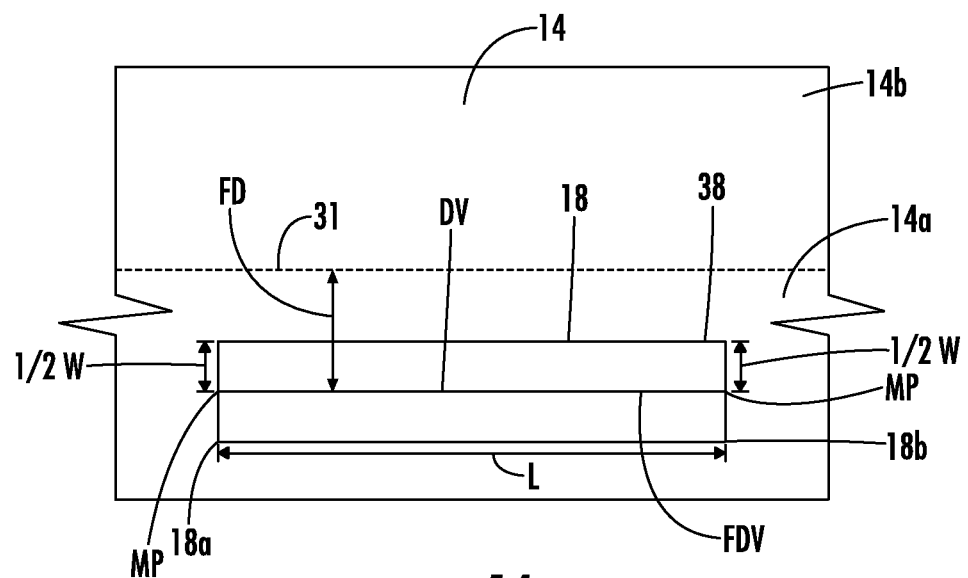
FIG. 14 is a cut-away view illustrating an elongate slot in a body portion, according to one embodiment of the present invention.
Figure 15:
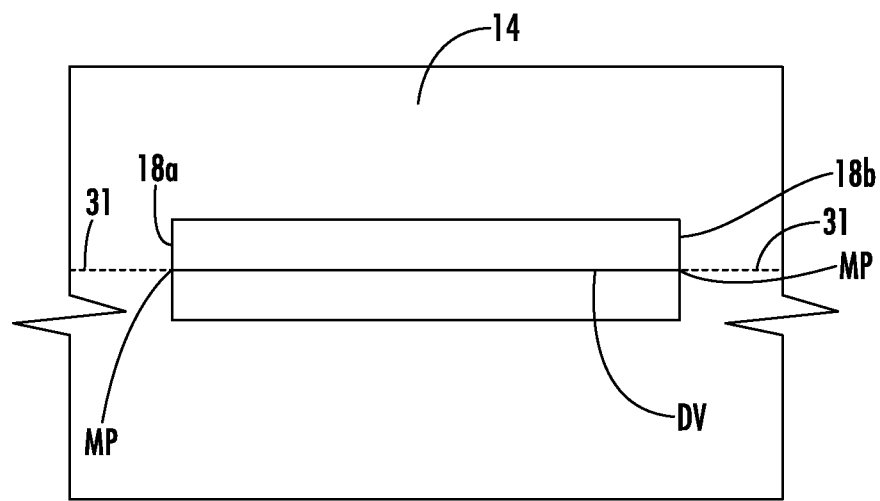
FIG. 15 is a cut-away view illustrating an elongate slot in a body portion, according to one embodiment of the present invention.
Figure 16:
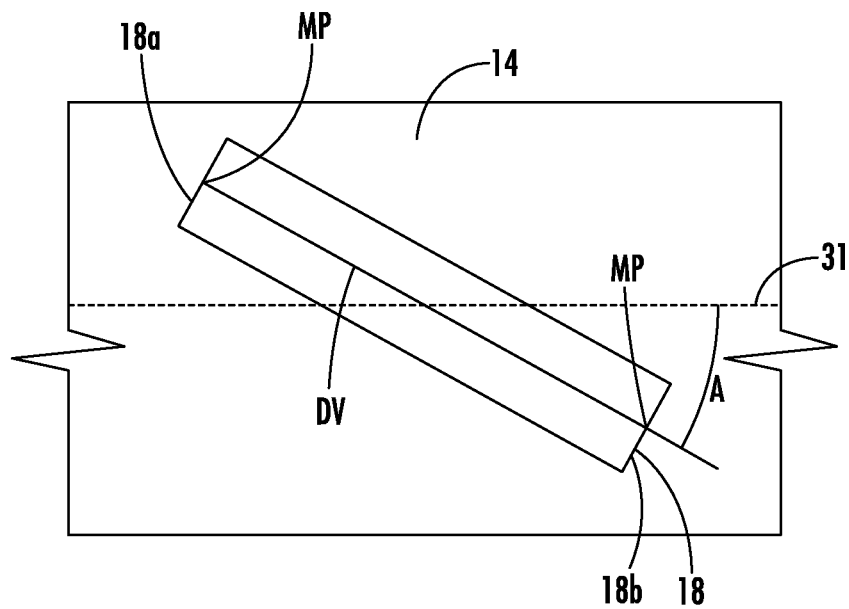
FIG. 16 is a cut-away view illustrating an elongate slot in a body portion, according to one embodiment of the present invention.

In one embodiment, as illustrated in FIG. 14, each elongate slot 18 comprises a directional vector DV defined by a line drawn along the slot length L of the elongate slot through a midway point MP of the slot width W at each of the first and second ends 18a, 18b of the elongate slot. In one embodiment, as illustrated in FIG. 15, the elongate slot 18 extends through the axis 31 (which, as noted above, can constitute the axis of symmetry of the body portion 14) and the axis and the directional vector DV of the elongate slot are parallel. In one embodiment, as illustrated in FIG. 16, the elongate slot 18 extends through the axis 31 (which, as noted above, can constitute the axis of symmetry of the body portion 14) and the axis and the directional vector DV of the elongate slot form an angle A. The angle A can be between 0° and 90°.

Figure 17:
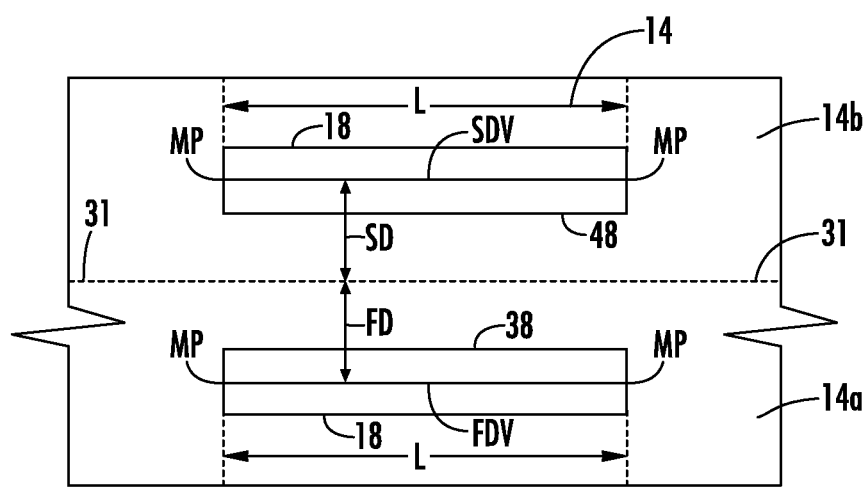
FIG. 17 is a cut-away view illustrating an elongate slot in a body portion, according to one embodiment of the present invention.

In one embodiment, as illustrated in FIG. 14, the body portion 14 defines a first side 14a and a second side 14b each extending along the axis 31, wherein the elongate slot 18 comprises a first elongate slot 38 extending through the first side 14a of the body portion 14. The first elongate slot 38 comprises a first directional vector FDV defined by a line drawn along the slot length L of the first elongate slot 38 through a midway point MP of the slot width W at each of the first and second ends 18a, 18b of the first elongate slot 38, wherein the first directional vector FDV is substantially parallel to the axis 31 and is spaced from the axis by a first distance FD. The distance FD can vary. In another embodiment, as illustrated in FIG. 17, the elongate slot 18 comprises a second elongate slot 48 extending through the second side 14b of the body portion 14, wherein the second elongate slot 48 comprises a second directional vector SDV defined by a line drawn along the slot length L of the second elongate slot 48 through a midway point MP of the slot width W at each of the first and second ends 18a, 18b of the second elongate slot 48, wherein the second directional vector SDV is substantially parallel to the axis and is spaced from the axis by a second distance SD. The distance FD can vary. In one embodiment, the first distance FD and the second distance SD are substantially equal. In another embodiment, the first distance FD and the second distance SD are not equal.

Figure 18A:
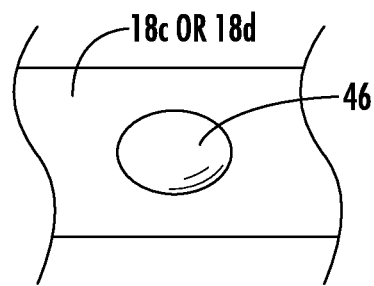
FIGS. 18a and 18b are cut-away views illustrating a sidewall of an elongate slot in a body portion, according to one embodiment of the present invention.
Figure 18B:
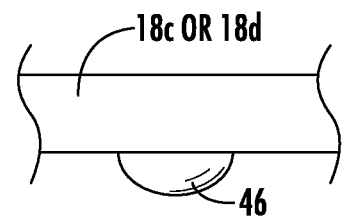
Figure 19A:
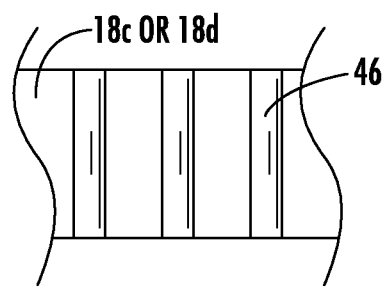
FIGS. 19a, 19b, 19c, and 19d are cut-away views illustrating a sidewall of an elongate slot in a body portion, according to embodiments of the present invention.
Figure 19B:
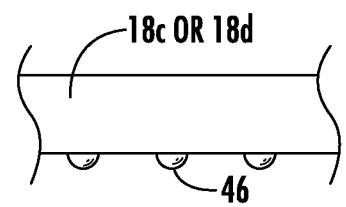
Figure 19C:
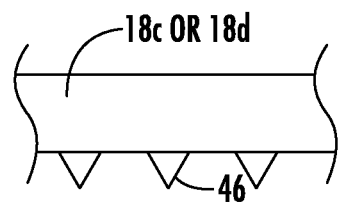
Figure 19D:
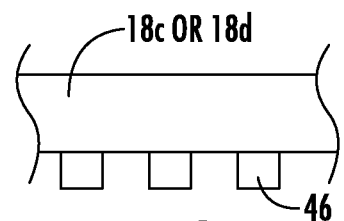

In one embodiment of the present invention, the surface of one or both opposed sidewalls 18c, 18d of the at least one elongate slot can be substantially smooth so as to provide minimal friction to water flowing through the slot 18 and over the sidewall or sidewalls, respectively. In other embodiments, one or both of the sidewalls 18c, 18d of the slot 18 can be structurally varied to provide friction to impart different movement to the fishing lure 10. This can be advantageous as it can impart motion to the lure of a fish in distress. According to one embodiment, as illustrated in FIGS. 18a and 18b, at least a portion of the surface of at least one of the opposed sidewalls 18c, 18d of the elongate slot 18 defines one or more raised portions 46. The number and configuration of the raised portions 46 can vary. For purposes of example and not limitation, in one embodiment, as illustrated in FIGS. 19a and 19b, the surface of at least one of the opposed sidewall 18c, 18d of the elongate slot defines at plurality of raised portions 46. As illustrated in FIG. 19b, the raised portions can have a rounded configuration at the end of the raised portion. As illustrated in FIG. 19c, the raised portions can have a triangular configuration at the end of the raised portion. As illustrated in FIG. 19d, the raised portions can have a square configuration at the end of the raised portion. The orientation of the raised portion 46 can also vary. In one embodiment, the raised portions 46 can extend parallel to the directional vector DV of the slot 18. In another embodiment, the raised portions 46 can extend perpendicular relative to the directional vector DV of the slot 18. In yet another embodiment the raised portions 46 can extend at an angle between 0° and 90° relative to the directional vector DV of the slot 18.

Figure 20A:
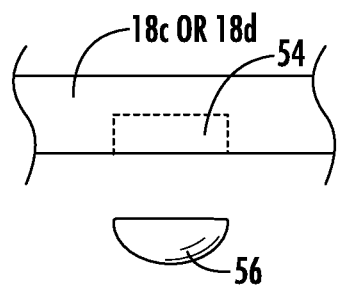
FIGS. 20a and 20b are cut-away views illustrating a sidewall of an elongate slot in a body portion and a fish attracting element, according to one embodiment of the present invention.

In another embodiment, as illustrated in FIG. 20a, the surface of at least one of the opposed sidewalls 18c, 18d of the slot can comprise one or more indentations 54 to modify the flow of water through the slot 18 and along the sidewall 18c, 18d of the slot.

Figure 20B:
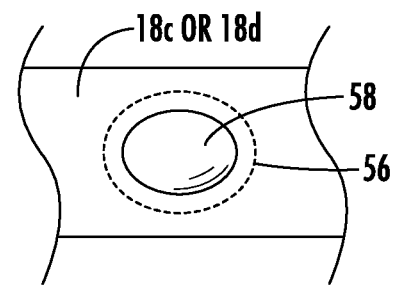

In still another embodiment of the present invention, as illustrated in FIG. 20b, at least one fish attracting element 56. In one embodiment, the fish attracting element 56 can be a sound-emitting device such as a bell or metal shell with a ball inside. In another embodiment, the fish attracting element 56 can be a light-emitting device such as a light-emitting diode. In still another embodiment, the fish attracting element 56 can be a scent-emitting device, such as a bait pellet. Preferably, the fish attracting element 56 is secured within a corresponding indentation 54. For example, as illustrated in FIGS. 20a and 20b, the size and depth of the indentation 54 can be slightly larger than the fish attracting element 56 so as to fully receive the fish attracting element, but the aperture 58 into the indentation is slightly smaller than the width of the fish attracting element so that the fish attracting element is retained within the indentation once inserted therein. Alternatively, the indentation and fish attracting element may comprise cooperating fasteners, such as hook and loop fasteners. In another embodiment, in place of the fish attracting element, a weight can be inserted into the indentation 54 as described above, particularly if would be advantageous to sink the fishing lure 10 to a desired depth.

According to another embodiment of the present invention, the body portion comprises a first elastomeric region and a second elastomeric region. The first elastomeric region and the second elastomeric region each have a hardness described by procedure ASTM 2240 (American Society of Testing and Materials) using the Shore A scale, wherein the hardness of the first elastomeric region is from approximately 2 to approximately 15 and, more preferably, approximately 8 to approximately 15 and the hardness of the second elastomeric region is from approximately 1 to approximately 8 and, more preferably, approximately 1 to approximately 4 and wherein the hardness of the first elastomeric region exceeds the hardness of the second elastomeric region. According to one embodiment, the slot 18 extends at least partially through the first elastomeric region or is contained entirely within the first elastomeric region. In embodiments where only one elastomeric region is provided, the hardness is from approximately 1 to approximately 8 and, more preferably, approximately 1 to approximately 4.

In order to achieve specific durometer or hardness ranges a variety of materials may be used. For purposes of example only and not limitation, a mixture of materials consisting primarily or mostly of the following polymeric materials may be used: Dioctyl Phthalate (DOP), Polyvinyl Chloride (PVC), and an elastomeric polymer emulsion (EPE), such as HYSTRETCH™ V60, manufactured and sold by Noveon, Inc. In general, the combination should be approximately 51 to 66.6% of DOP, approximately 11-22.4% of PVC, approximately 5-28% of EPE and approximately 2-6% of other materials. In order to increase durometer hardness, the PVC component should be increased. Conversely, to decrease durometer hardness the PVC component should be decreased. For purposes of example only and not limitation, a combination of approximately 66.6% DOP, approximately 22.4% PVC, approximately 5% EPE, and approximately 6% of other material has a durometer hardness of approximately 14 to 15 on the Shore A scale. A combination of approximately 59% DOP, approximately 20.5% PVC, approximately 16% EPE, and approximately 4.5% of all other materials has a durometer hardness of approximately 10 to 12 on the Shore A scale. For purposes of example only and not limitation, a combination of approximately 57% DOP, approximately 19% PVC, approximately 19% EPE, and approximately 5% of other material has a durometer hardness of approximately 7 to 8 on the Shore A scale. A combination of approximately 51% DOP, approximately 17% PVC, approximately 27% EPE, and approximately 5% of other materials has a durometer hardness of approximately 5 to 6 on the Shore A scale. A combination of approximately 55% DOP, approximately 14% PVC, approximately 28% EPE, and approximately 3% of other materials has a durometer hardness of approximately 3 to 4 on the Shore A scale. A combination approximately of 59% DOP, approximately 11% PVC, approximately 28% EPE, and approximately 2% all other materials has a durometer hardness of approximately 1 to 2 of the Shore A scale. The "other materials" generally have a minimal impact on hardness; however, the use of other materials may be used to influence, among other things, the color, texture, smell, and flavoring of the elastomeric material and, thus, the fishing lure 10.

Figure 21A:
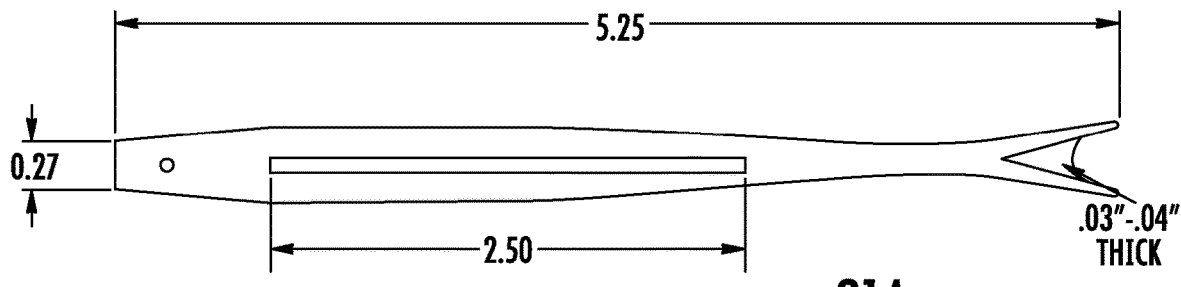
FIGS. 21a, 21b, 21c, and 21d are plan views illustrating a fishing lure, according to one embodiment of the present invention.
Figure 21B:
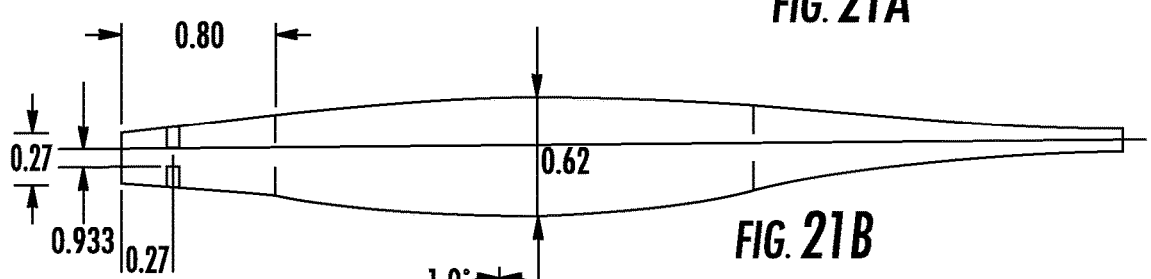
Figure 21D:
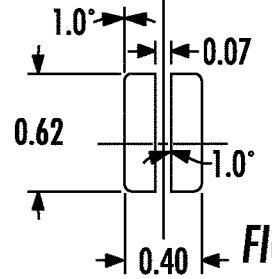
Figure 21C:
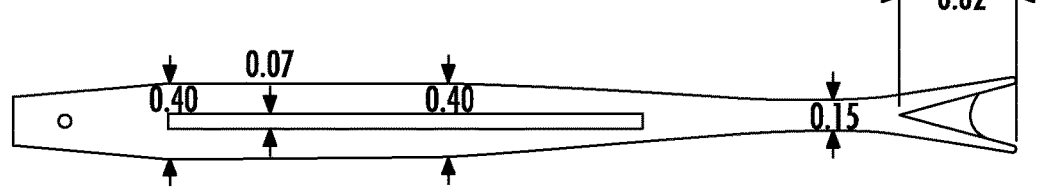

Referring to FIGS. 21a, b, c and d, there is illustrated one preferred body of the fishing lure according to the present invention setting forth the dimensions of the lure.

According to another embodiment of the invention, the sidewalls 18c and 18d of the slot 18 can be angled or tapered such that the slot width W is greatest at the openings of the slot on the surface of the body portion and more narrow in the middle of the interior of the slot. This embodiment is advantageous because the wider openings on the opposing sides of the lure when retrieved cause and or allow water to flow in at one speed and, because of the angles of the interior sidewalls 18c, 18d, the speed of the water would be increased as it is funneled/directed through wider outside portions of the opening. In addition, as the water is directed to the inner portion of the slot 18 where the slot width W is at its narrowest point at the horizontal centerline of the lure 10, the water will force the slot 18 in the body portion 14 to generate vibrations in the sides of the body portion, which are created by the sidewall 18c, 18d movement and transmitted through the body portion to the tail portion 16 where the energy from the vibrations impart the realistic swimming motion to the lure. In one embodiment, the angles on the outside of the body portion 14 preferably can be configured to mimic the interior sidewalls 18c, 18d of the slot 18 to contribute to the uniformity of the sidewall thickness. The thickness of the sides of the body portion in relation to the interior sidewalls 18c, 18d, as illustrated in FIGS. 20a, b, c, and d can improve the transmissibility of the energy/vibration generated by the water flowing through the slot 18 and directing/funneling that energy/vibration to the tail portion 16 to produce the swimming action.

A present invention also provides methods of forming a fishing lure. According to one embodiment, the method comprises providing a die cavity having an elongate tool extending into the die cavity. An elastomeric resin is injected into the die cavity about the elongate tool to form a fishing lure having a flexible body portion having first and second ends, wherein the body portion defines an axis extending along the centerline of the body portion, and wherein the elongate tool forms an elongate slot defining first and second ends and a slot length extending therebetween, the elongate slot defining a pair of opposed sidewalls, wherein the distance between the opposed sidewalls defines a slot width, the at least one elongate slot extending through the body portion along at least a portion of the slot length. In one embodiment, the elongate tool defines at least one indentation in the surface of the elongate tool. In another embodiment, the elongate tool defines at least one raised portion.

In another embodiment, the method of forming a fishing lure comprises providing a die cavity. An elastomeric resin is injected into the die cavity to form a fishing lure having a flexible body portion having first and second ends, wherein the body portion defines an axis extending along the centerline of the body portion. An elongate tool is inserted into the flexible body portion to form an elongate slot defining first and second ends and a slot length extending therebetween, the elongate slot defining a pair of opposed sidewalls, wherein the distance between the opposed sidewalls defines a slot width, the at least one elongate slot extending through the body portion along at least a portion of the slot length.

In yet another embodiment of the present invention, the method of forming a fishing lure comprises joining a first elastomeric region to a second elastomeric region so as to define an interface, wherein the first and second elastomeric regions each have a hardness on the Shore A scale and the hardness of the first elastomeric region is from approximately 2 to approximately 15 and the hardness of the second elastomeric region is from approximately 1 to approximately 8 and wherein the hardness of the first elastomeric region exceeds the hardness of the second elastomeric region. The joining step comprising providing a die cavity having a first cavity region and a second cavity region divided by a partition; providing an elongate tool extending into the first cavity region; injecting a first elastomeric resin into the first cavity region about the elongate tool to form the first elastomeric region; injecting a second elastomeric resin into the second cavity region to form the second elastomeric region; removing the partition in the die cavity separating the first cavity region from the second cavity region and contacting at least a portion of the second elastomeric resin to at least a portion of the first elastomeric resin at the interface; and cooling the first and second elastomeric resins so that the first and second elastomeric resins bond together at the interface to thereby form an integral elastomeric portion comprising a flexible body portion having first and second ends, wherein the body portion defines an axis extending along the centerline of the body portion, and wherein the elongate tool forms an elongate slot defining first and second ends and a slot length extending therebetween, the elongate slot defining a pair of opposed sidewalls, wherein the distance between the opposed sidewalls defines a slot width, the at least one elongate slot extending through the body portion along at least a portion of the slot length.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An elastomeric fishing lure, comprising:
    a flexible body portion having first and second ends, a ventral side, a dorsal side and first and second outer sides, wherein the second outer side is opposite the first outer side, and wherein the body portion defines a centerline and an axis extending along the centerline of the body portion; and
    at least one elongate slot in the body portion, the at least one elongate slot defining first and second ends and a slot length extending therebetween, the at least one elongate slot defining a pair of opposed sidewalls, wherein the distance between the opposed sidewalls defines a slot width, the at least one elongate slot extending through the entirety of the body portion from the dorsal side to the ventral side along the entirety of the slot length, wherein the distance between the dorsal side to the ventral side defines a slot height, and wherein the slot width is substantially constant along the entire slot length and slot height so as to create two flexible side members.

2. An elastomeric fishing lure according to claim 1, wherein the body portion is substantially symmetrical and the axis defines an axis of symmetry, and wherein the at least one elongate slot comprises a directional vector defined by a line drawn along the slot length of the at least one elongate slot through a midway point of the slot width at each of the first and second ends of the at least one elongate slot, and wherein the at least one elongate slot extends through the axis of symmetry and the axis of symmetry and the directional vector of the at least one elongate slot are either parallel or form an angle between 0° and 90°.

3. An elastomeric fishing lure according to claim 1, wherein the first outer side and the second outer side each extend along the axis, wherein the at least one elongated slot comprises a first elongate slot which comprises a first directional vector defined by a line drawn along the slot length of the first elongate slot through a midway point of the slot width at each of the first and second ends of the first elongate slot, wherein the first directional vector is substantially parallel to the axis and is spaced from the axis by a first distance.

4. An elastomeric fishing lure according to claim 3, wherein the at least one elongate slot further comprises a second elongate slot extending through the body portion from the dorsal side to the ventral side, wherein the second elongate slot comprises a second directional vector defined by a line drawn along the slot length of the second elongate slot through a midway point of the slot width at each of the first and second ends of the second elongate slot, wherein the second directional vector is substantially parallel to the axis and is spaced from the axis by a second distance.

5. An elastomeric fishing lure according to claim 4, wherein the first distance and the second distance are substantially equal.

6. An elastomeric fishing lure according to claim 4, wherein the first distance and the second distance are not equal.

7. An elastomeric fishing lure according to claim 1, wherein a surface of at least one opposed sidewall of the pair of opposed sidewalls of the at least one elongate slot is substantially smooth.

8. An elastomeric fishing lure according to claim 1, wherein the body portion comprises a first elastomeric region and a second elastomeric region, wherein the first elastomeric region and the second elastomeric region each have a hardness on the Shore A scale, wherein the hardness of the first elastomeric region is from approximately 2 to approximately 15 and the hardness of the second elastomeric region is from approximately 1 to approximately 8 and wherein the hardness of the first elastomeric region exceeds the hardness of the second elastomeric region.

9. An elastomeric fishing lure according to claim 8, wherein the at least one elongate slot extends at least partially through the first elastomeric region.

10. An elastomeric fishing lure according to claim 8, wherein the at least one elongate slot is contained entirely within the first elastomeric region.

11. A method of forming a fishing lure, comprising:
    providing a die cavity having an elongate tool extending into the die cavity;
    injecting an elastomeric resin into the die cavity about the elongate tool to form a fishing lure having a flexible body portion having first and second ends, a ventral side, a dorsal side and first and second outer sides, wherein the second outer side is opposite the first outer side, wherein the body portion defines a centerline and an axis extending along the centerline of the body portion, and wherein the elongate tool forms at least one elongate slot in the body portion, the at least one elongate slot defining first and second ends and a slot length extending therebetween, the at least one elongate slot defining a pair of opposed sidewalls, wherein the distance between the opposed sidewalls defines a slot width, the at least one elongate slot extending through the entirety of the body portion from the dorsal side to the ventral side along the entirety of the slot length, wherein the distance between the dorsal side to the ventral side defines a slot height, and wherein the slot width is substantially constant along the entire slot length and slot height so as to create two flexible side members.

12. A method of forming a fishing lure, comprising:
    providing a die cavity;
    injecting an elastomeric resin into the die cavity to form a fishing lure having a flexible body portion having first and second ends, a ventral side, a dorsal side and first and second outer sides, wherein the second outer side is opposite the first outer side, and wherein the body portion defines a centerline and an axis extending along the centerline of the body portion;
    inserting an elongate tool into the flexible body portion to form at least one elongate slot defining first and second ends and a slot length extending therebetween, the at least one elongate slot defining a pair of opposed sidewalls, wherein the distance between the opposed sidewalls defines a slot width, the at least one elongate slot extending through the entirety of the body portion from the dorsal side to the ventral side along the entirety of the slot length, wherein the distance between the dorsal side to the ventral side defines a slot height, and wherein the slot width is substantially constant along the entire slot length and slot height so as to create two flexible side members.

13. A method of forming a fishing lure, comprising:
    joining a first elastomeric region to a second elastomeric region so as to define an interface, wherein the first and second elastomeric regions each have a hardness on the Shore A scale and the hardness of the first elastomeric region is from approximately 2 to approximately 15 and the hardness of the second elastomeric region is from approximately 1 to approximately 8 and wherein the hardness of the first elastomeric region exceeds the hardness of the second elastomeric region, said joining step comprises:

providing a die cavity having a first cavity region and a second cavity region divided by a partition;

providing an elongate tool extending into the first cavity region;

injecting a first elastomeric resin into the first cavity region about the elongate tool to form the first elastomeric region;

injecting a second elastomeric resin into the second cavity region to form the second elastomeric region;

removing the partition in the die cavity separating the first cavity region from the second cavity region and contacting at least a portion of the second elastomeric resin to at least a portion of the first elastomeric resin at the interface; and cooling the first and second elastomeric resins so that the first and second elastomeric resins bond together at the interface to thereby form an integral elastomeric portion comprising a flexible body portion having first and second ends, a ventral side, a dorsal side and first and second outer sides, wherein the second outer side is opposite the first outer side, wherein the body portion defines a centerline and an axis extending along the centerline of the body portion, and wherein the elongate tool forms at least one elongate slot in the body portion, the at least one elongate slot defining first and second ends and a slot length extending therebetween, the at least one elongate slot defining a pair of opposed sidewalls, wherein the distance between the opposed sidewalls defines a slot width, the at least one elongate slot extending through the entirety of the body portion from the dorsal side to the ventral side along the entirety of the slot length, wherein the distance between the dorsal side to the ventral side defines a slot height, and wherein the slot width is substantially constant along the entire slot length and slot height so as to create two flexible side members.

\* \* \* \* \*